Sept. 4, 1923.  1,466,778
H. A. WOODS
LOCKING MEANS FOR DIFFERENTIAL GEARS
Filed Dec. 27, 1921  2 Sheets-Sheet 1

INVENTOR HERBERT A. WOODS,
by Ralph Kalish ATTORNEY.

Sept. 4, 1923.
H. A. WOODS
LOCKING MEANS FOR DIFFERENTIAL GEARS
Filed Dec. 27, 1921
1,466,778
2 Sheets-Sheet 2
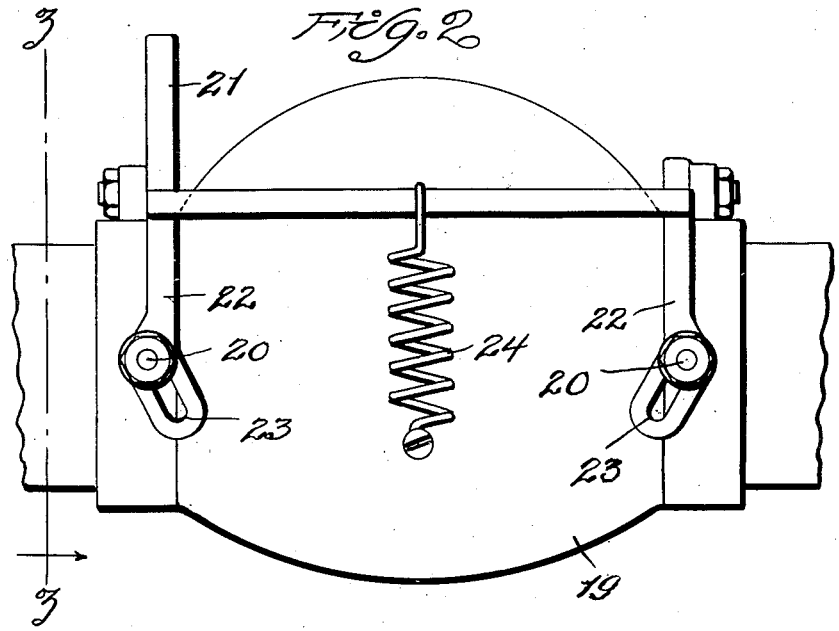
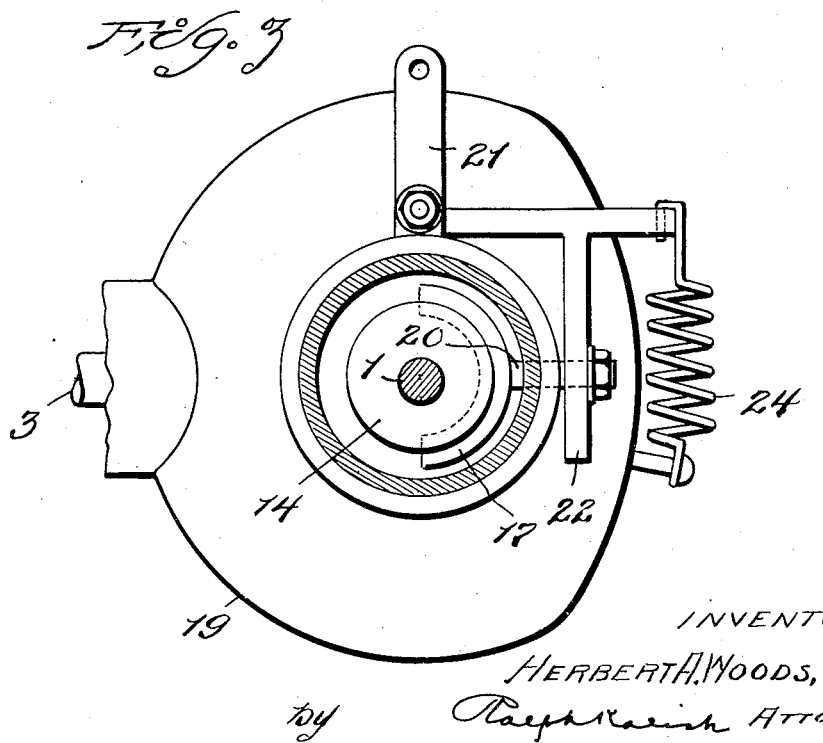
INVENTOR
HERBERT A. WOODS,
by Ralph Kalish ATTORNEY.

Patented Sept. 4, 1923.

1,466,778

UNITED STATES PATENT OFFICE.

HERBERT A. WOODS, OF ST. LOUIS, MISSOURI.

LOCKING MEANS FOR DIFFERENTIAL GEARS.

Application filed December 27, 1921. Serial No. 524,960.

*To all whom it may concern:*

Be it known that I, HERBERT A. WOODS, a citizen of the United States, residing at the city of St. Louis and State of Missouri, have invented a certain new and useful Improvement in Locking Means for Differential Gears, of which the following is a specification, reference being had to the accompanying drawings, forming a part thereof.

This invention relates generally to differential gears and, more particularly, to a certain new and useful improvement in locking-means for differential gears designed especially for use on automobiles and the like, the principal object of my present invention being to provide a conveniently actuated or manipulated means for relatively simple construction for selectively locking the oppositely-disposed gear-driven or live axles for effecting substantially unitary rotation thereof.

With the above and other objects in view, my present invention resides in the novel features of form, construction, arrangement, and combination of parts hereinafter described and afterwards pointed out in the claims.

In the accompanying drawing,

Figure 2 is a rear elevational view of the gear-housing, showing parts of the locking-means actuating members; and Figure 3 is a view of the locking-means partly in elevation and partly in section on approximately the line 3—3, Figure 2.

Figure 1:
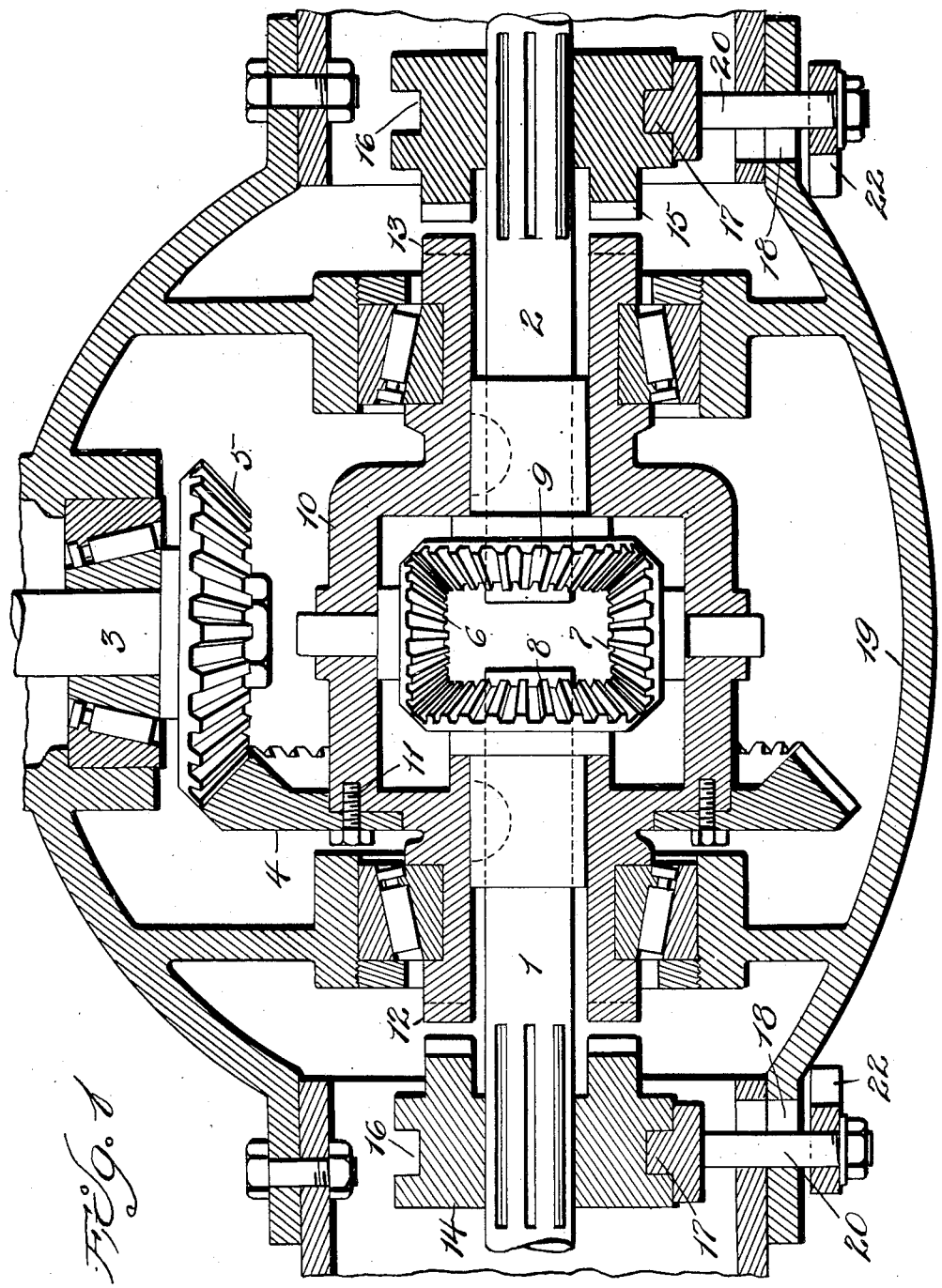
Figure 1 shows in horizontal sectional elevation a differential gear locking-means constructed in accordance with and embodying my invention.

Referring now more in detail to the said drawings, which illustrate a practical embodiment of my invention and in which like reference characters refer to like parts throughout the several views, 1 and 2 indicate the live or gear-driven rear axle or wheel-shafts, and 3 the driving or differential shaft, the shaft 1 being directly connected with the shaft 3 through a ring-gear 4 and pinion 5, and the shaft 2 being connected with the shaft 1 through a set of meshing pinions or gears 6, 7, 8, and 9, some of which latter gears are, as is usual and as shown journaled in a gear-box 10. As is common, this arrangement of gears relates or connects the shafts 1 and 2 with the driving shaft 3 for, as I may say, relatively independent rotation, whereby the road or rear driving wheels, not shown, fixed on the shafts 1 and 2 may be rotated at different angular velocities. With this standard equipment, however, it will be evident that, should the automobile, for instance, have the road-wheel on, say, shaft 1 supported on a surface which the wheel is incapable of gripping, such as, for illustration, an excessively oiled or muddy hole, and the other wheel on shaft 2 being hence incapable of rotation, the automobile may be, and frequently is, hopelessly stalled and incapable of movement by its own power. Assuming, further, that the wheel on shaft 2 is supported on a stable surface and a means is provided for directly connecting such shaft with the differential shaft 3, then obviously the machine could be moved by its own power. To this end I provide my new locking-means.

Formed preferably as integral parts, and disposed upon opposite sides, of the gear box 10, and which box, in turn, is fixed, as by screws, bolts, or the like 11, to the ring-gear 4 and thereby directly connected to the driving-pinion 5, are crown clutch-members 12 and 13.

Keyed or feathered on the live axles or driven shafts 1 and 2 for rotation with the shafts and for axial movement on the shafts relatively to, and for engagement with, the crown clutch-members 12 and 13, are co-operating clutch members 14 and 15, each of which latter is formed with an annular channel, as at 16. Riding in each channel 16, is a shoe 17, and projecting rearwardly from each shoe through slots 18 formed in the axle or gear-housing 19, are stems 20.

Pivotally mounted for swinging movement upon the housing 19, is a lever comprising a main power-arm 21 and a pair of depending branch-arms 22 engaging at their free or lower ends by means of cam slots 23 with the projecting ends of stems 20.

Connected at its opposite ends to the lever 21 and to the housing 19, is an expansion spring 24 for normally holding the lever 21 in retracted or normal position and the clutch members 14—15 in "out of clutch" engagement with the clutch-members 12—13, so that the differential gear as a whole functions normally. And I may here add that the lever arm 21 is suitably extended, as by a link or the like, not shown, for convenient pivotal actuation by the driver of the automobile.

When the power arm 21 is manually or otherwise actuated or pulled against the tension of the spring 24, its branch arms 22 are elevated and the shoe-stems 20, in turn, by the cam-slots 23 oppositely actuated inwardly, the clutch members 14—15 being thereby shifted in unison into clutching engagement with the crown clutch-members 12—13, when, as will be seen, the live axles or driven shafts 1 and 2 will be related or connected to the driving-shaft 3 for, what I term or designate, unitary rotation. On release of the lever 21, the several parts, including the clutch-members 14—15, will be yieldingly returned by spring 24 to normal position, when the differential functions as normally and the shafts 1 and 2 being then, as I may say, independently rotatable.

I am aware that changes in the form, construction, arrangement, and combination of the several parts of my new differential gear locking-means may be made and substituted for those herein shown and described without departing from the nature and principle of my invention.

Having thus described my invention, what I desire and claim to secure by Letters Patent is:

1. In combination with a differential gear, the same comprising a driving-shaft, a pair of separate driven-shafts, means including a main gear and a gear box fixed to the main gear for relating the driven shaft to the driving-shafts for relatively independent rotation of the driven-shafts, means for operatively connecting the driven shafts with the driving-shaft for relatively unitary rotation of the driven-shafts, said means including clutch-members on the gear box, clutch members shiftable on the driven-shafts into engagement with the first clutch-members, each of said second clutch-members having an annular slot, shoes disposed in said slots, stems projecting from the shoes, and a pivoted lever having cam-slot engagement with said stems for shifting the second clutch members.

2. In combination with a differential gear, the same comprising a driving-shaft, a pair of separate driven-shafts, means including a main gear and a gear box fixed to the main gear for relating the driven shaft to the driving-shafts for relatively independent rotation of the driven-shafts, means for operatively connecting the driven shafts with the driving-shaft for relatively unitary rotation of the driven-shafts, said means including clutch-members on the gear box, clutch members shiftable on the driven-shafts into engagement with the first clutch-members, each of said second clutch-members having an annular slot, shoes disposed in said slots, stems projecting from the shoes, a pivoted lever having cam-slot engagement with said stems for shifting the second clutch members, and a spring for yieldingly returning said lever and the second clutch-members to normal position.

In testimony whereof, I have signed my name to this specification.

HERBERT A. WOODS.